United States Patent
Tohyama (10) Patent No.: US 9,236,905 B2
(45) Date of Patent: Jan. 12, 2016

(54) WIRELESS COMMUNICATION SYSTEM INCLUDING FREQUENCY HOPPING ELECTRONIC DEVICES, AND CONTROL METHOD AND STORAGE MEDIUM THEREFOR

(71) Applicant: CANON KABUSHIKI KAISHA, Tokyo (JP)

(72) Inventor: Kei Tohyama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/372,636

(22) PCT Filed: Dec. 27, 2012

(86) PCT No.: PCT/JP2012/084298
§ 371 (c)(1),
(2) Date: Jul. 16, 2014

(87) PCT Pub. No.: WO2013/111518
PCT Pub. Date: Aug. 1, 2013

(65) Prior Publication Data
US 2015/0023395 A1 Jan. 22, 2015

(30) Foreign Application Priority Data
Jan. 26, 2012 (JP) .................... 2012-014195

(51) Int. Cl.
*H04B 1/00* (2006.01)
*H04B 1/7156* (2011.01)

(52) U.S. Cl.
CPC .................... *H04B 1/7156* (2013.01)

(58) Field of Classification Search
CPC .................................................. H04B 1/7156
USPC ................ 375/134, 220, 285, 295, 316, 359; 348/45, 294, 500, 371
See application file for complete search history.

(56) References Cited

U.S. PATENT DOCUMENTS

| | | | | |
|---|---|---|---|---|
| 5,852,630 A | * | 12/1998 | Langberg et al. | 375/219 |
| 2001/0019417 A1 | * | 9/2001 | Ueki | 358/1.9 |
| 2011/0188845 A1 | * | 8/2011 | Hanayama et al. | 396/155 |

FOREIGN PATENT DOCUMENTS

| | | |
|---|---|---|
| JP | 2003-283381 A | 10/2003 |
| JP | 2005-191960 A | 7/2005 |
| JP | 2006-311392 A | 11/2006 |
| JP | 2011-158712 A | 8/2011 |

OTHER PUBLICATIONS

The foreign references 2-4 were cited the International Search Report of International Application No. PCT/JP2012/084298 issued on Apr. 16, 2016.

* cited by examiner

*Primary Examiner* — Dhaval Patel
(74) *Attorney, Agent, or Firm* — Cowan Liebowitz & Latman, P.C.

(57) ABSTRACT

A wireless communication system in which a master device and a slave device each performing wireless communication by a frequency hopping system can operate in synchronism with each other. In the master device, a master microcomputer outputs a first sync signal to a RTC unit after a transmission timing signal is received and a carrier frequency is changed a predetermined number of times according to a first change timing signal. In the slave device, a slave microcomputer outputs a second sync signal to a RTC unit after a reception timing signal is received and a carrier frequency is changed the predetermined number of times according to a second change timing signal.

28 Claims, 9 Drawing Sheets

WIRELESS COMMUNICATION SYSTEM INCLUDING FREQUENCY HOPPING ELECTRONIC DEVICES, AND CONTROL METHOD AND STORAGE MEDIUM THEREFOR

TECHNICAL FIELD

The present invention relates to a wireless communication system including electronic devices that perform wireless communication by a frequency hopping system, a control method for the wireless communication system, and a storage medium storing a program for executing the control method.

BACKGROUND ART

Conventionally, there has been proposed a wireless frequency hopping technique in which a carrier frequency is switched according to a hopping pattern. For example, PTL1 discloses a trigger generation apparatus for providing a measurement start trigger to a measurement apparatus that measures a condition of a communication apparatus for performing communication by a frequency hopping system. The trigger generation apparatus has a communication means for data communication with the communication apparatus and a frequency hopping means for switching a frequency used in the communication means. The trigger generation apparatus outputs a trigger at time of communication of a measurement start position in data (e.g., at communication of a payload header of a data packet). In response to the trigger, the measurement apparatus starts measurement. This makes it easy for the measurement apparatus to be synchronized with the communication apparatus.

CITATION LIST

Patent Literature

{PTL1} Japanese Laid-open Patent Publication No. 2003-283381

SUMMARY OF INVENTION

Technical Problem

However, with the prior art disclosed in PTL1, a delay time to achieve synchronization between the measurement apparatus (slave device) and the communication apparatus (master device) does not become constant, if a frequency hopping pattern is random. The delay time also varies due to individual difference of the measurement apparatus since the measurement apparatus performs synchronization according to a trigger, which is output at the time of communication of a data packet payload.

Figure 9:
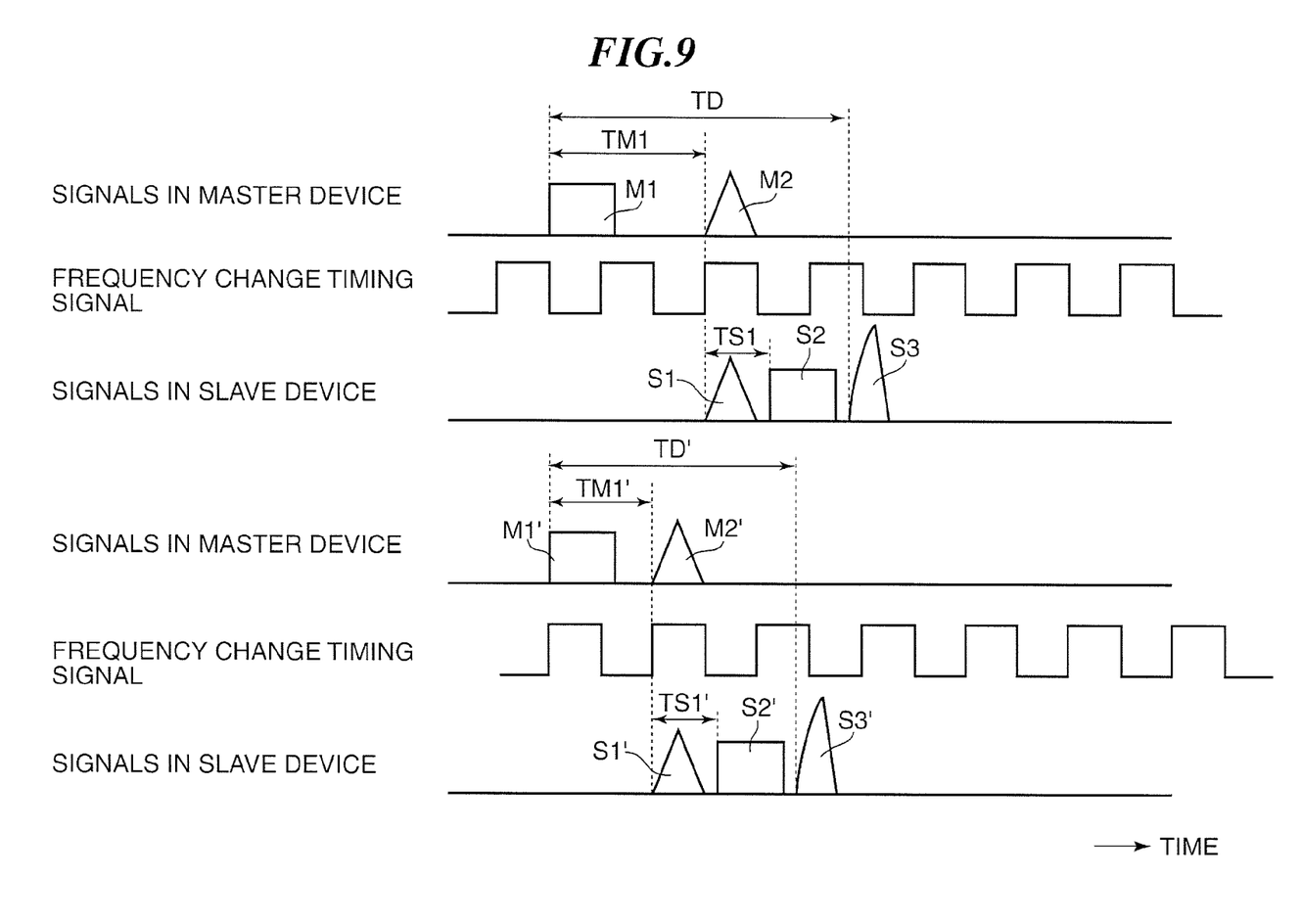
[FIG. 9] A timing chart showing operations of a conventional wireless communication system.

With reference to FIG. 9, a description will be given of the aforementioned problem by taking as an example a wireless light emission system that includes wireless transmitter-receiver units each having a frequency hopping function.

FIG. 9 is a timing chart showing operations of a master device and a slave device of the wireless light emission system.

In the master device, a communication signal M1 (e.g., a preliminary light emission start signal) is transmitted from a control microcomputer (hereinafter, referred to as the master microcomputer) to a wireless transmitter-receiver unit, and then a wireless transmission signal M2 is transmitted from the transmitter-receiver unit. A frequency hopping carrier frequency is changed at leading and trailing edges of a frequency change timing signal, which is shown below the signals M1, M2. When a time period TM1 has lapsed from start of communication of the signal M1, hopping to a particular frequency is done and the transmitter-receiver unit starts transmitting the signal M2.

In the slave device, a wireless transmitter-receiver unit receives a wireless transmission signal S1 from the master device, and demodulates the signal S1. When a time period TS1 has elapsed from the start of communication of the signal S1, a demodulated signal S2 is started to be transmitted from the transmitter-receiver unit to a control microcomputer (hereinafter, referred to as the slave microcomputer). When a time period TD has elapsed from the start of communication of the signal M1 from the master microcomputer to the slave device, a preliminary light emission operation shown by a waveform S3 is started.

The time period TM1 is a time period from the start of communication of the signal M1 to the execution of hopping to a particular frequency, and is not necessarily constant. The time period TS1 varies due to individual difference of the slave device. Accordingly, the time period TD from the start of communication of the preliminary light emission start signal M1 by the master microcomputer to the start of preliminary light emission operation by the slave device is not constant. This poses a problem that timing of light measurement performed by the master device to decide an amount of light for preliminary light emission cannot be synchronized with timing of preliminary light emission by the slave device.

In a case that a frequency hopping time slot is divided into a transmission slot and a reception slot, a similar problem occurs even in a system where the transmitter-receiver unit of the master device starts transmitting a wireless transmission signal without waiting the execution of hopping to a particular frequency. Signals in the master device and signals in the slave device in that case are shown in a lower half of FIG. 9.

In the master device, the wireless transmitter-receiver unit starts transmitting a wireless transmission signal M2' when a time period TM1' has elapsed from the start of communication of a preliminary light emission start signal M1' from the master microcomputer to the transmitter-receiver unit. A section where a frequency change timing signal, which is shown below the signals M1' and M2', is at a H level is a transmission slot section in which the transmitter-receiver unit performs transmission, whereas a section where the timing signal is at an L level is a reception slot section in which the transmitter-receiver unit performs reception.

In the slave device, the transmitter-receiver unit receives a wireless transmission signal S1' from the master device and demodulates the signal S1', and starts communication of a demodulated signal S2' to the slave microcomputer when a time period TS1' has elapsed from the start of reception of the signal S1'. When a time period TD' has elapsed from the start of communication of the preliminary light emission start signal M1' by the master microcomputer, a preliminary light emission operation shown by a waveform S3' is started.

The time period TS1' varies due to individual difference of the slave device. The time period TD' varies depending on the time period TS1' and is not necessarily constant. This poses a problem that the time period TD' from the start of transmission of the preliminary light emission start signal M1' to the execution of preliminary light emission does not become constant.

The present invention provides a wireless communication system in which a master device and a slave device, which are electronic devices performing wireless communication by a frequency hopping system, can operate in synchronism with each other, and provides a control method for the wireless communication system and a storage medium storing a program for executing the control method.

Solution to Problem

Accordingly, one aspect of this invention provides a wireless communication system comprising a master device including a first time measuring unit configured to count time, a first wireless transmitter-receiver unit configured to perform wireless communication by a frequency hopping system and output a first change timing signal and configured to output a transmission timing signal at a time of wireless transmission, and a first control unit configured to output a first sync signal to the first time measuring unit after the transmission timing signal is received and then a carrier frequency is changed a predetermined number of times according to the first change timing signal, and a slave device including a second time measuring unit configured to count time, a second wireless transmitter-receiver unit configured to perform wireless communication by a frequency hopping system and output a second change timing signal and configured to output a reception timing signal at a time of wireless reception, and a second control unit configured to output a second sync signal to the second time measuring unit after the reception timing signal is received and then a carrier frequency is changed a predetermined number of times according to the second change timing signal.

The features and advantages of the invention will become more apparent from the following detailed description taken in conjunction with the accompanying drawings.

Advantageous Effects of Invention

With this invention, electronic devices such as a master device and a slave device each performing wireless communication by a frequency hopping system can operate in synchronization with each other.

DESCRIPTION OF EMBODIMENTS

In the following, embodiments of this invention will be described in detail with reference to the appended drawings.

Figure 1:
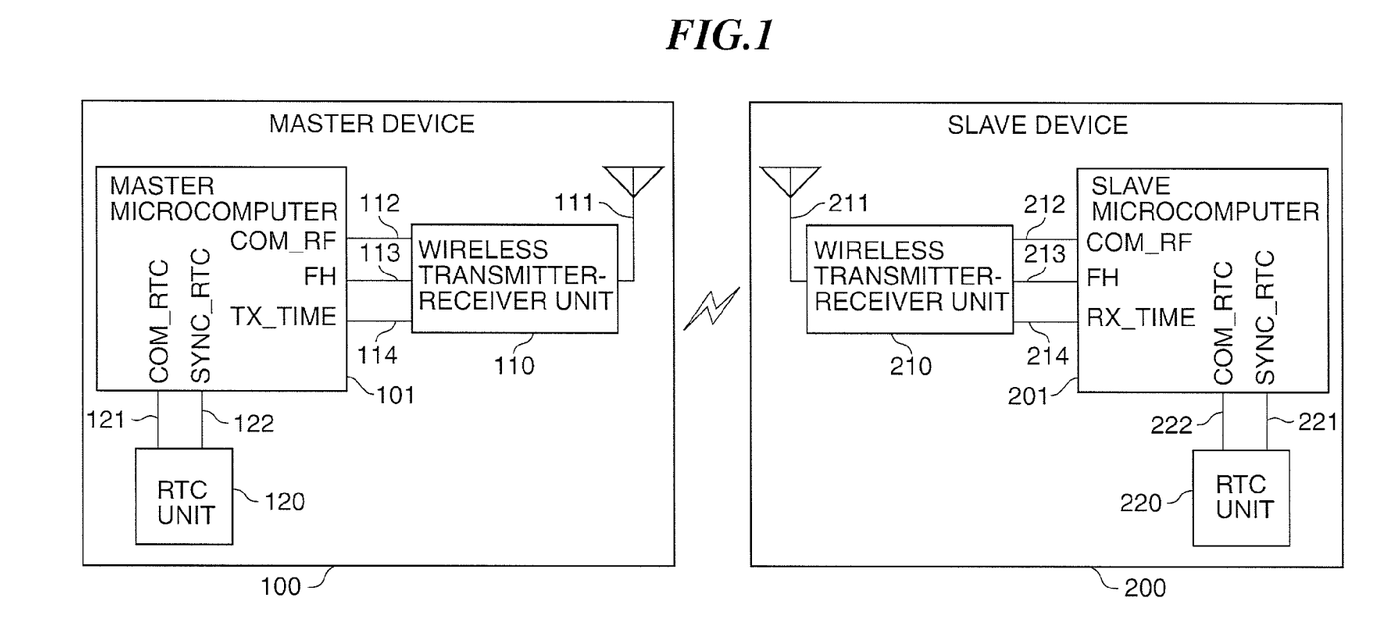
[FIG. 1] A view schematically showing the construction of a wireless communication system according to a first embodiment of this invention.

FIG. 1 schematically shows the construction of a wireless communication system according to a first embodiment of this invention.

As shown in FIG. 1, the wireless communication system of this embodiment includes a master device 100 and a slave device 200, which are electronic devices.

The master device 100 includes a master microcomputer 101 that controls respective parts of the master device, a wireless transmitter-receiver unit (hereinafter, sometimes referred to as the transmitter-receiver unit) 110 that performs wireless communication with the slave device 200 by a frequency hopping system, and a realtime clock unit (hereinafter, referred to as the RTC unit) 120 that counts time in the master device 100. The transmitter-receiver unit 110 is connected with an antenna 111.

The master microcomputer 101 has a COM_RF terminal, a FH (frequency hopping) terminal, and a TX_TIME terminal (interrupt terminal) respectively connected through signal lines 112 to 114 to the transmitter-receiver unit 110, and has a COM_RTC terminal and a SYNC_RTC terminal respectively connected through signal lines 121, 122 to the RTC unit 120.

The master microcomputer 101 transmits a communication enable signal and a communication clock signal to the transmitter-receiver unit 110 through the signal line 112. In synchronism with the communication clock signal, a data signal is transmitted and received between the master microcomputer 101 and the transmitter-receiver unit 110 through the signal line 112.

The master microcomputer 101 is supplied at the FH terminal with a FH change timing signal from the transmitter-receiver unit 110 through the signal line 113, the signal being switched between H level and L level at timings where a FH carrier frequency is changed. The master microcomputer 101 has a FH counter (not shown) that counts the number of execution times of frequency hopping, and a count value of the FH counter (representing the number of FH execution times) is incremented at leading and trailing edges of the FH change timing signal, which is input to the FH terminal.

The master microcomputer 101 is supplied at the TX_TIME terminal with a transmission timing signal from the transmitter-receiver unit 110 through the signal line 114, the signal becoming a H level at the time of wireless transmission from the transmitter-receiver unit 110.

The master microcomputer 101 transmits a communication enable signal and a communication clock signal to the RTC unit 120 through the signal line 121. In synchronism with the communication clock signal, a data signal is transmitted and received between the master microcomputer 101 and the RTC unit 120 through the signal line 121.

The RTC unit 120 receives a sync signal of H level from the master microcomputer 101 through the signal line 122, and performs time synchronization according to the sync signal.

The slave device 200 includes a slave microcomputer 201 that controls respective parts of the slave device, a wireless transmitter-receiver unit (hereinafter, sometimes referred to as the transmitter-receiver unit) 210 that performs wireless communication with the master device 100 by a frequency hopping system, and includes a realtime clock unit (hereinafter, referred to as the RTC unit) 220 that counts time in the slave device 200. The transmitter-receiver unit 210 is connected with an antenna 211.

The slave microcomputer 201 has a COM_RF terminal, a FH (frequency hopping) terminal, and a RX_TIME terminal (interrupt terminal) respectively connected through signal lines 212 to 214 to the transmitter-receiver unit 210, and has a SYNC_RTC terminal and a COM_RTC terminal respectively connected through signal lines 221, 222 to the RTC unit 220.

The slave microcomputer 201 transmits a communication enable signal and a communication clock signal to the transmitter-receiver unit 210 through the signal line 212. In synchronism with the communication clock signal, a data signal is transmitted and received between the slave microcomputer 201 and the transmitter-receiver unit 210 through the signal line 212.

The slave microcomputer 201 is supplied at the FH terminal with a FH change timing signal from the transmitter-receiver unit 210 through the signal line 213, the signal being switched between H level and L level at timings where a FH carrier frequency is changed. The slave microcomputer 201 has a FH counter (not shown) that counts the number of FH execution times, and a count value of the FH counter (representing the number of FH execution times) is incremented at leading and trailing edges of the FH change timing signal input to the FH terminal.

The slave microcomputer 201 is supplied at the RX_TIME terminal with a reception timing signal from the transmitter-receiver unit 210 through the signal line 214, the signal becoming a H level at the time of wireless reception by the transmitter-receiver unit 210.

The slave microcomputer 201 transmits a communication enable signal and a communication clock signal to the RTC unit 220 through the signal line 222. In synchronism with the communication clock signal, a data signal is transmitted and received between the slave microcomputer 201 and the RTC unit 220 through the signal line 222.

The RTC unit 220 receives a sync signal of H level from the slave microcomputer 201 through the signal line 221, and performs time synchronization according to the sync signal.

Next, with reference to FIGS. 2 to 4, a description will be given of synchronization operations of the RTC unit 120 of master device 100 and the RTC unit 220 of the slave device 200.

Figure 2:
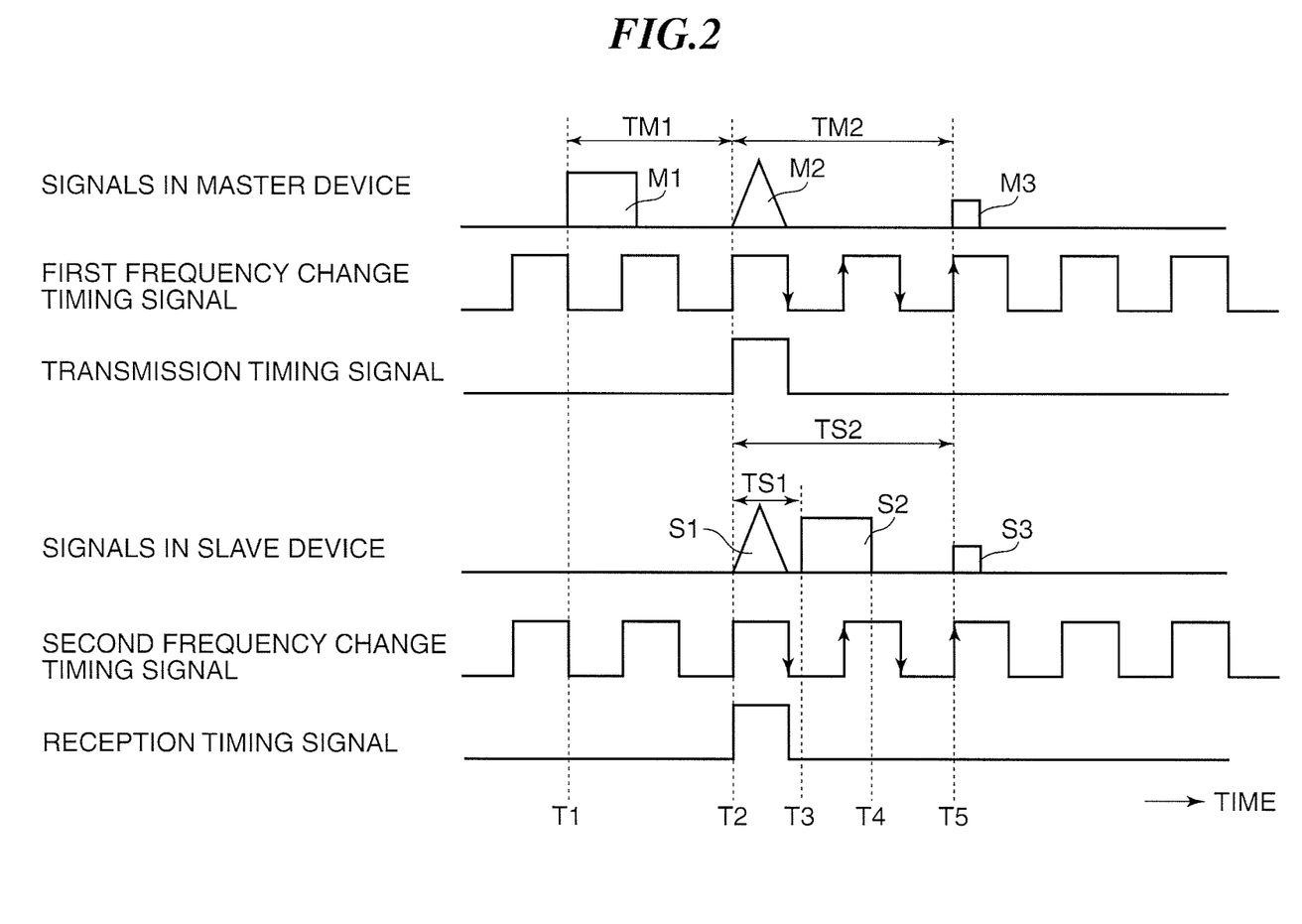
[FIG. 2] A timing chart showing operations of a master device and a slave device of the wireless communication system.

FIG. 2 shows operations of the master device 100 and the slave device 200 in timing chart.

In an upper half of FIG. 2, there are shown signals relating to the master device 100. Symbol M1 denotes a communication signal from the master microcomputer 101 to the wireless transmitter-receiver unit 110, M2 denotes a wireless transmission signal supplied from the transmitter-receiver unit 110 to the slave device 200 through the antenna 111, and M3 denotes a sync signal from the master microcomputer 101 to the RTC unit 120.

A first frequency change timing signal for changing a frequency hopping (FH) carrier frequency, which is shown below the signals M1 to M3, is supplied from the transmitter-receiver unit 110 to the master microcomputer 101 through the signal line 113. A section where the first frequency change timing signal is at H level is a transmission slot section in which the transmitter-receiver unit 110 performs transmission, whereas a section where the change timing signal is at L level is a reception slot section in which the transmitter-receiver unit 110 performs reception.

A transmission timing signal, which is shown below the first frequency change timing signal, is supplied from the wireless transmitter-receiver unit 110 to the master microcomputer 101 through the signal line 114.

As described above, in accordance with the first frequency change timing signal, the transmitter-receiver unit 110 receives the communication signal M1 and transmits the wireless transmission signal M2, and the master microcomputer 101 transmits the sync signal M3. In the illustrated example, communication of the wireless transmission signal M2 is started at timing T2 where a time period TM1 has elapsed from the start of communication of the communication signal M1 (timing T1), and communication of the sync signal M3 is started at timing T5 where a time period TM2 has elapsed from the start of communication of the wireless transmission signal M2.

In a lower half of FIG. 2, signals relating to the slave device 200 are shown. Symbol S1 denotes a wireless signal received by the wireless transmitter-receiver unit 210 from the master device 100. The transmitter-receiver unit 210 demodulates the signal S1 into a signal S2, and starts transmitting the demodulated signal S2 to the slave microcomputer 201 at timing T3 where a time period TS1 has elapsed from the start of reception of the signal S1 (timing T2), and completes transmitting the signal S2 at timing T4. At timing T5 where a time period TS2 has elapsed from the start of reception of the signal S1, transmission of the sync signal S3 from the slave microcomputer 201 to the RTC unit 220 is started.

A second frequency change timing signal for changing a frequency hopping (FH) carrier frequency, which is shown below the signals S1 to S3, is supplied from the transmitter-receiver unit 210 of the slave device 200 to the slave microcomputer 201 through the signal line 213. A reception timing signal, which is shown below the second frequency change timing signal, is supplied from the transmitter-receiver unit 210 to the slave microcomputer 201.

Figure 3A:
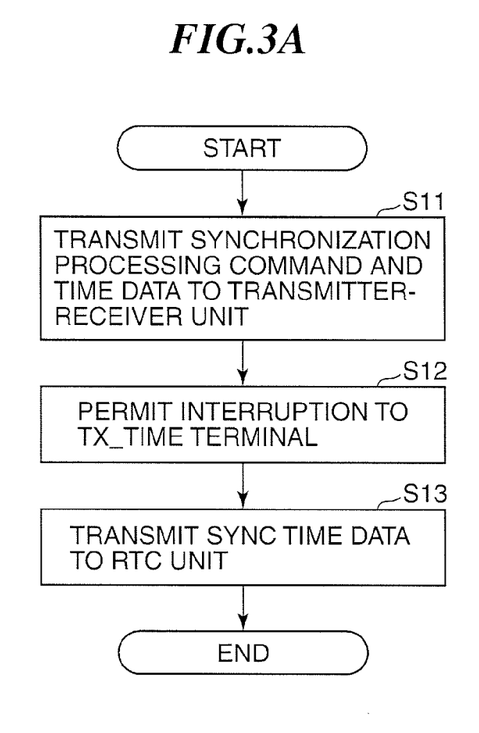
[FIG. 3A] A flowchart showing an operation process performed by a master microcomputer of the master device.

FIG. 3A shows in flowchart an operation process performed by the master microcomputer 101 through the signal line 214.

When an instruction to achieve synchronization between the RTC unit 120 of the master device 100 and the RTC unit 220 of the slave device 200 is given by a user through an operation unit (not shown), the operation process of FIG. 3A is started.

In step S11, the master microcomputer 101 transmits to the wireless transmitter-receiver unit 110 a command for RTC synchronization processing and time data, which correspond to the signal M1. This transmission is started at timing T1 in FIG. 2. Next, the master microcomputer 101 permits an interruption to the TX_TIME terminal at timing earlier than timing T2 in FIG. 2 (step S12).

The wireless transmitter-receiver unit 110 receives the command for RTC synchronization processing and the time data from the master microcomputer 101, wirelessly transmits the received command and data, and sets the transmission timing signal at H level. As a result, an interruption occurs at the TX_TIME terminal of the master microcomputer 101 at timing T2 in FIG. 2.

Next, the master microcomputer 101 transmits sync time data corresponding to the signal M3 to the RTC unit 120 through the signal line 121 (step S13), and completes the operation process.

Figure 3B:
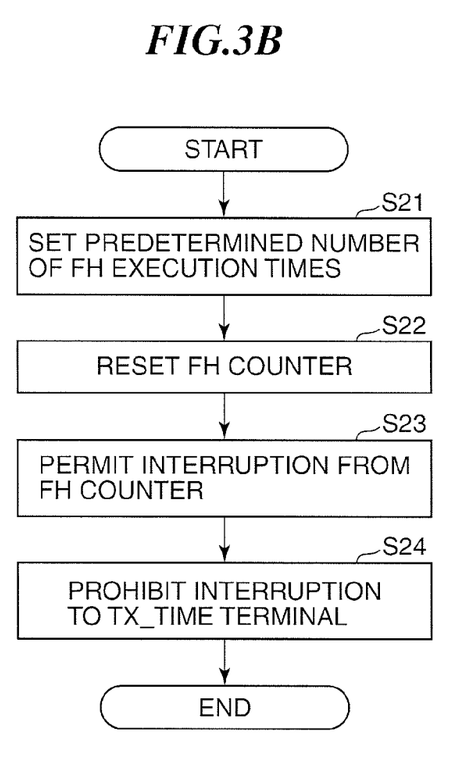
[FIG. 3B] A flowchart showing an interrupt process performed by the master microcomputer when an interruption occurs at an interrupt terminal of the master microcomputer.

FIG. 3B shows in flowchart an interrupt process performed by the master microcomputer 101 when an interruption occurs at the TX_TIME terminal of the master microcomputer 101.

The interrupt process of FIG. 3B is started when an interruption occurs at the TX_TIME terminal of the master microcomputer 101 at timing T2 in FIG. 2.

In step S21, the master microcomputer 101 sets a predetermined number of times (e.g. four times) for which frequency hopping (FH) is to be performed to permit the FH counter to generate an interruption.

Next, the master microcomputer 101 resets the FH counter (step S22), and permits an interruption from the FH counter (step S23). As a result, an interruption is generated from the FH counter when the number of FH execution times counted by the FH counter reaches the predetermined number of times (e.g., four times).

In step S24, the master microcomputer 101 prohibits an interruption to the TX_TIME terminal, thereby preventing an interruption to the TX_TIME terminal from being generated by communication processing other than the synchronization processing. Then, the interrupt process is completed.

Figure 3C:
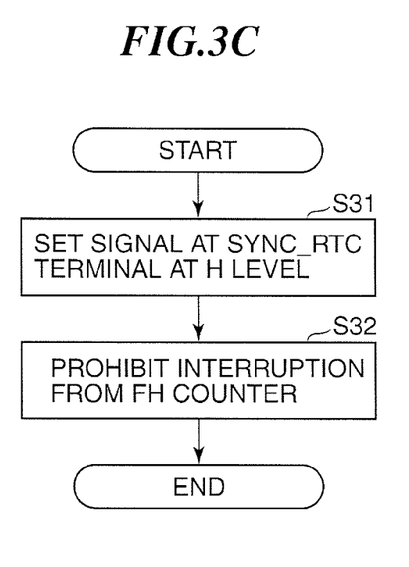
[FIG. 3C] A flowchart showing an interrupt process performed by the master microcomputer when an interruption is generated from a FH counter.

FIG. 3C shows in flowchart an interrupt process performed by the master microcomputer 101 when an interruption is generated from the FH counter.

The interrupt process shown in FIG. 3C is started when frequency hopping has been performed the predetermined number of times (e.g., four times) from the start of transmission of the wireless transmission signal M2 by the wireless transmitter-receiver unit 110 (i.e., at timing T5 in FIG. 2).

In step S31, the master microcomputer 101 sets an output signal appearing at the SYNC_RTC terminal at H level for a predetermined period of time, whereby the RTC unit 120 can adjust the time therein to the time represented by the time data transmitted from the master microcomputer 101 in step S11 in FIG. 3A.

In step S32, the master microcomputer 101 prohibits an interruption from the FH counter, thereby preventing an interruption from being generated from the FH counter after completion of the synchronization operation of the RTC unit 120. Then, the interrupt process is completed.

Figure 4A:
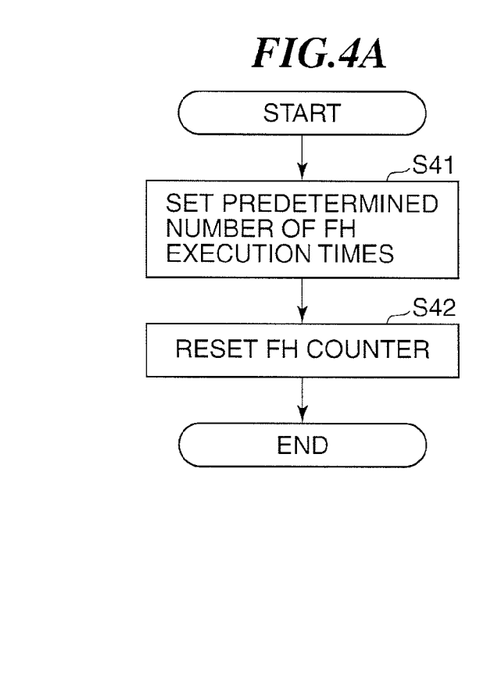
[FIG. 4A] A flowchart showing an operation process performed by a slave microcomputer of the slave device when an interruption to an interrupt terminal of the slave microcomputer is generated.

FIG. 4A shows in flowchart an operation process performed by the slave microcomputer 201 when an interruption to the RX_TIME terminal is generated.

When the wireless transmitter-receiver unit 210 of the slave device 200 receives the signal S1 from the master device 100 through the antenna 211, a reception timing signal of H level is supplied to the RX_TIME terminal of the slave microcomputer 201. Thus, an interruption occurs at the RX_TIME terminal, and the operation process shown in FIG. 4A is started.

In step S41, the slave microcomputer 201 sets the predetermined number of times (e.g. four times) for which frequency hopping (FH) is to be performed to permit the FH counter to generate an interruption. Next, the slave microcomputer 201 resets the FH counter (step S42), and completes the present process.

Figure 4B:
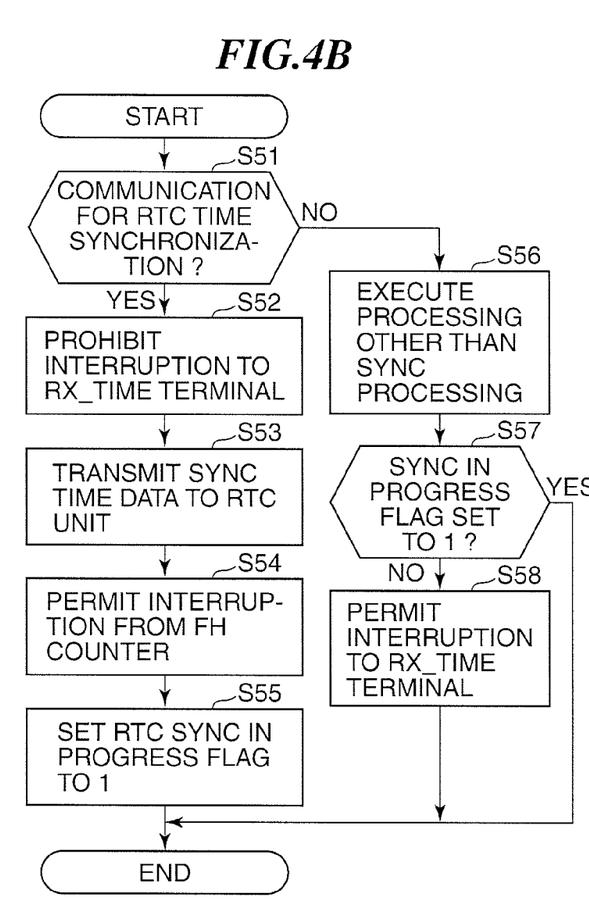
[FIG. 4B] A flowchart showing an interrupt process performed by the slave microcomputer in response to a signal being transmitted to the slave microcomputer from a wireless transmitter-receiver unit of the slave device.

FIG. 4B shows in flowchart an interrupt process performed by the slave microcomputer 201 in response to the signal S2 being transmitted from the wireless transmitter-receiver unit 210 to the slave microcomputer 201.

The transmitter-receiver unit 210 demodulates a signal S1 received from the master device 100 into a signal S2, and transmits the signal S2 to the slave microcomputer 201. Upon completion of transmission of the signal S2 (at timing T4 in FIG. 2), the interrupt process of FIG. 4B is started.

In step S51, the slave microcomputer 201 determines whether or not communication with the master device 100 is communication for RTC time synchronization. If the answer to step S51 is YES, the flow proceeds to step S52. Otherwise, the flow proceeds to step S56.

In step S52, the slave microcomputer 201 prohibits interruption to the RX_TIME terminal. Next, the slave microcomputer 201 transmits time data received from the master device 100 to the RTC unit 220 through the signal line 221 (step S53), permits interruption from the FH counter (step S54), and sets a "RTC sync in progress" flag to a value of 1 (step S55), whereupon the present process is completed.

In step S56, the slave microcomputer 201 executes communication processing other than RTC sync processing. Next, the slave microcomputer 201 determines whether or not the "RTC sync in progress" flag has a value of 1 (step S57), and completes the present process, if the answer to step S57 is YES. Otherwise, the process proceeds to step S58.

In step S58, the slave microcomputer 201 permits interruption to the RX_TIME terminal, and completes the present process. By allowing interruption to the RX_TIME terminal only when it is determined in step S57 that the "RTC sync in progress" flag does not have a value of 1, it is possible to prevent interruption to the RX_TIME terminal from being generated during RTC sync processing.

Figure 4C:
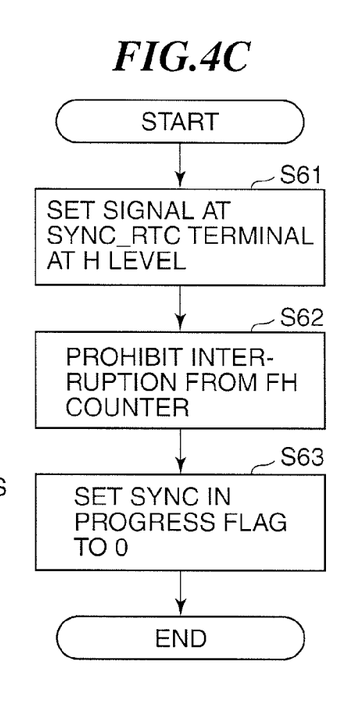
[FIG. 4C] A flowchart showing an interrupt process performed by the slave microcomputer when frequency hopping has been performed a predetermined number of times and an interruption is generated from the FH counter.

FIG. 4C shows in flowchart an interrupt process performed by the slave microcomputer 201 when an interruption is generated from the FH counter.

The interrupt process shown in FIG. 4C is started when interruption from the FH counter is generated (timing T5 in FIG. 2) after frequency hopping is performed the predetermined number of times (e.g., four times) from when the wireless transmitter-receiver unit 210 has received a wireless signal.

In step S61, the slave microcomputer 201 sets an output signal appearing at the SYNC_RTC terminal at H level for a predetermined period of time, whereby the RTC unit 220 can adjust the time therein to the time represented by the time data received from the slave microcomputer 201 in step S53 in FIG. 4B.

In step S62, the slave microcomputer 201 prohibits interruption from the FH counter, thereby preventing an interruption from being generated from the FH counter after completion of sync operation of the RTC unit 220. Next, the slave microcomputer 201 sets the "RTC sync in progress" flag to a value of 0 (step S63), and completes the interrupt process.

According to this embodiment, the RTC units 120, 220 are set with the same time at timing T5 where frequency hopping has been performed the predetermined number of times from when transmission of the wireless signal M2 from the master device 100 to the slave device 200 and reception of the signal S1 by the slave device 200 were started. As a result, even if there is a variation in the time period (denoted by TM1 in FIG. 2) from when communication of the signal M1 by the master device 100 was started to when transmission of the signal M2 was started or even if there is a variation in the time period (denoted by TS1 in FIG. 2) from when reception of the signal S1 by the wireless transmitter-receiver unit 210 was started to when transmission of the signal S2 was started, it is possible to set the same time in the RIC units 120, 220, thereby achieving synchronization between the master device 100 and the slave device 200.

It should be noted that although the transmitter-receiver unit is built in each of the master device 100 and the slave device 200 in this embodiment, the transmitter-receiver unit can be externally connected thereto. Although the predetermined number of FH execution times is set to a fixed value (e.g., four times), this is not limitative. For example, the transmitter-receiver unit of the master device 100 can decide the predetermined number of FH execution times based on at least one of operation conditions of the master device and the slave device such as an amount and speed of communication from the master microcomputer to the transmitter-receiver unit, an amount and speed of communication from the transmitter-receiver unit of the slave device to the slave microcomputer, and frequency hopping change interval, and can transmit information representing the decided predetermined number of FH execution times to the transmitter-receiver unit of the slave device 200.

Figure 5:
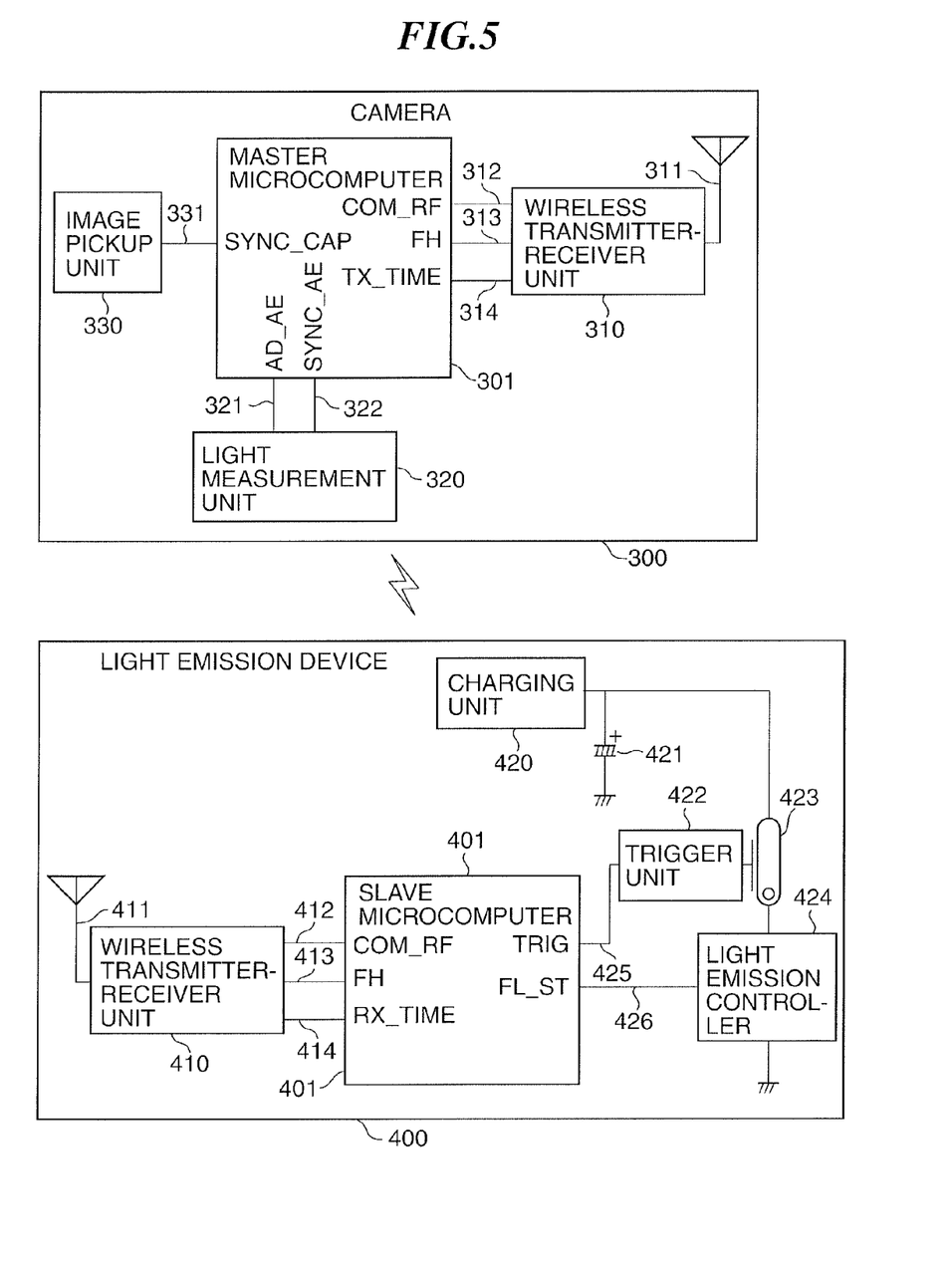
[FIG. 5] A view schematically showing the construction of a wireless communication system according to a second embodiment of this invention.

FIG. 5 schematically shows the construction of a wireless communication system according to a second embodiment of this invention.

As shown in FIG. 5, the wireless communication system of this embodiment includes an image pickup apparatus, e.g., a camera 300 serving as a master device, and a light emission device 400 serving as a slave device.

The camera 300 includes a master microcomputer 301 that controls respective parts of the camera, a wireless transmitter-receiver unit 310 that performs wireless communication with the light emission device 400 by a frequency hopping system, a light measurement unit 320 that performs light measurement of environmental light and preliminary light emission of the light emission device 400, and an image pickup unit 330 having an imaging element. The transmitter-receiver unit 310 is connected with an antenna 311.

The master microcomputer 301 has a COM_RF terminal, a FH terminal, and a TX_TIME terminal respectively connected through signal lines 312 to 314 to the transmitter-receiver unit 310, has an AD_AE terminal and a SYNC_AE terminal respectively connected through signal lines 321, 322 to the light measurement unit 320, and has a SYNC_CAP terminal connected through a signal line 331 to the image pickup unit 330.

The light measurement unit 320 starts light measurement when a signal of H level is supplied from the SYNC_AE terminal of the master microcomputer 301. A signal representing a result of the light measurement is supplied from the light measurement unit 320 to the AD_AE terminal of the master microcomputer 301 and A/D converted in the master microcomputer 301. When a signal of H level is output from the SYNC_CAP terminal of the master microcomputer 301, the image pickup unit 330 starts an image pickup operation.

The light emission device 400 includes a slave microcomputer 401 that controls respective parts of the light emission device, a wireless transmitter-receiver unit 410 that performs wireless communication with the camera 300 by a frequency hopping system, and a charging unit 420 that steps up the voltage of a battery (not shown) to about 300 V.

The slave microcomputer 401 has a COM_RF terminal, a FH terminal, and a RX_TIME terminal respectively connected through signal lines 412 to 414 to the transmitter-receiver unit 410 that is connected with an antenna 411. The charging unit 420 is connected with a primary capacitor 421 that stores electric energy.

The light emission device 400 includes an electric discharge tube 423 (light emission unit) that converts electric energy stored in the primary capacitor 421 into light, a trigger unit 422 that causes the discharge tube 423 to start discharging, a light emission controller 424 that enables the discharge tube 423 to emit light and causes the discharge tube 423 to stop emitting light.

The trigger unit 422 applies a trigger voltage of several KVs to the discharge tube 423 to cause it to start discharging in response to a H level signal being output from a TRIG terminal of the slave microcomputer 401 through a signal line 425.

The light emission controller 424 forms a discharge loop extending from the anode of the primary capacitor 421 through the discharge tube 423 and the light emission controller 424 to the cathode (GND) of the primary capacitor 421 to enable the discharge tube 423 to emit light in response to a H level signal being output from a FL_ST terminal of the slave microcomputer 401 through a signal line 426. In response to a L level signal being output from the FL_ST terminal of the slave microcomputer 401 through the signal line 426, the light emission controller 424 disconnects the discharge loop to cause the electric discharge tube 423 to stop emitting light.

Next, with reference to FIGS. 6 to 8, a description will be given of operations to synchronize light measurement timing of the light measurement unit 320 of the camera 300 and preliminary light emission timing of the light emission device 400.

Figure 6:
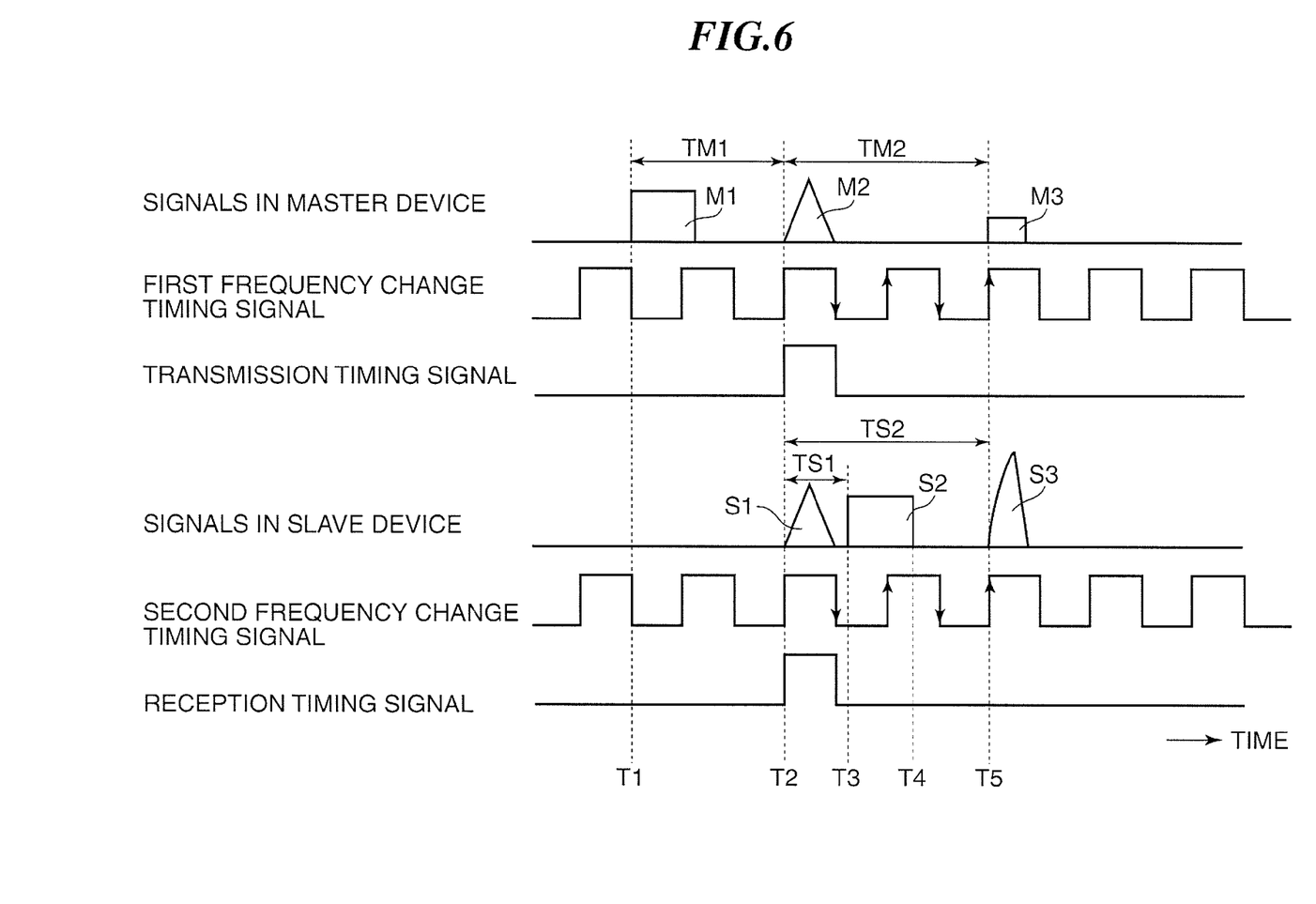
[FIG. 6] A timing chart showing operations of the wireless communication system shown in FIG. 5.

FIG. 6 shows operations of the camera 300 and the light emission device 400 in timing chart, which is basically the same as the timing chart shown in FIG. 2 and will be briefly described below.

In FIG. 6, symbol M1 denotes a communication signal from the master microcomputer 301 of the camera 300 to the wireless transmitter-receiver unit 310, M2 denotes a wireless signal transmitted from the transmitter-receiver unit 310 to the light emission device 400, and M3 denotes a light measurement control signal transmitted through the signal line 322 to the light measurement unit 320. A first frequency change timing signal is shown below the signals M1 to M3, and a transmission timing signal from the transmitter-receiver unit 310 to the master microcomputer 301 is shown below the first frequency change timing signal. Symbol S1 denotes a signal from the camera 300 to the transmitter-receiver unit 410 of the light emission device 400, S2 denotes a signal demodulated from the signal S1, and S3 denotes a preliminary light emission signal of the light emission device 400. A second frequency change timing signal is shown below the signals S1 to S3, and a reception timing signal from the transmitter-receiver unit 410 to the slave microcomputer 401 is shown below the second frequency change timing signal.

Figure 7A:
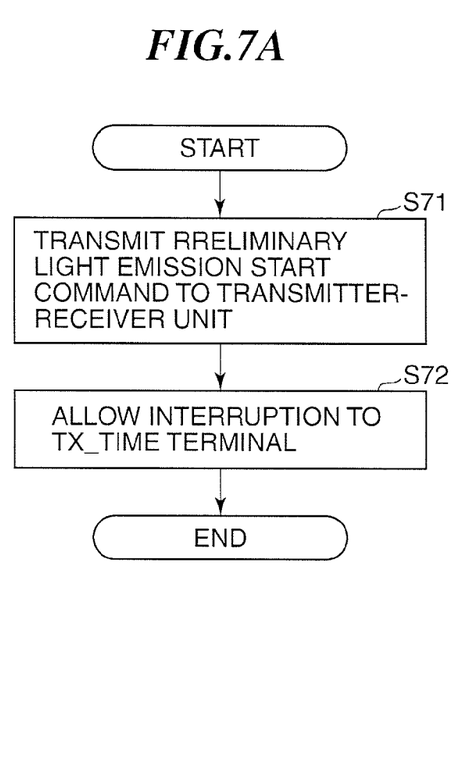
[FIG. 7A] A flowchart showing an operation process performed by a master microcomputer of the second embodiment in response to a release operation or a preliminary light emission start operation.

FIG. 7A shows in flowchart an operation process performed by the master microcomputer 301 in response to a release operation or a preliminary light emission start operation.

The operation process shown in FIG. 7A is started when a release operation or a preliminary light emission start operation is performed by a user through an operation unit (not shown) of the camera 300.

In step S71, the master microcomputer 301 transmits a preliminary light emission start command to the transmitter-receiver unit 310. The transmission is started at timing T1 in FIG. 6. Next, the master microcomputer 301 allows interruption to the TX_TIME terminal at timing earlier than timing T2 in FIG. 6 (step S72), and completes the present process.

The transmitter-receiver unit 310 receives a preliminary light emission start command from the master microcomputer 301, wirelessly transmits the received command, and sets a transmission timing signal at H level. As a result, an interruption occurs at the TX_TIME terminal of the master microcomputer 301 at timing T2 in FIG. 6.

Figure 7B:
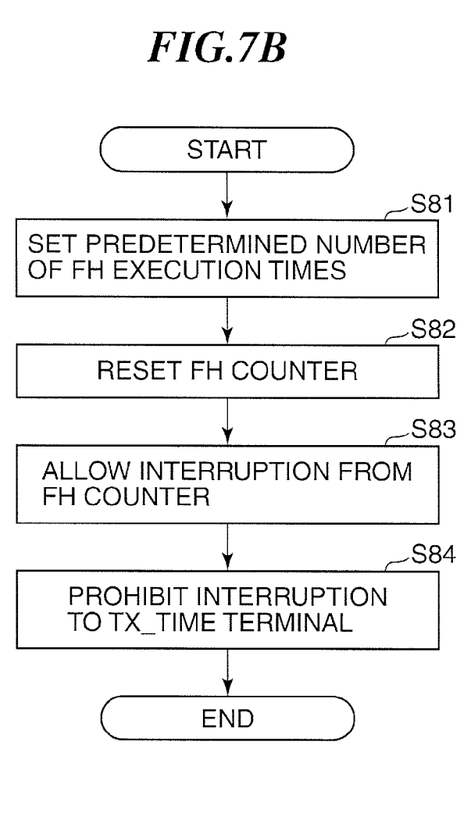
[FIG. 7B] A flowchart showing an interrupt process performed by the master microcomputer when an interruption occurs at a TX_TIME terminal of the master microcomputer.

FIG. 7B shows in flowchart an interrupt process performed by the master microcomputer 301 when an interruption occurs at the TX_TIME terminal of the master microcomputer 301.

In steps S81 to S84 of the interrupt process of FIG. 7B, processing is performed, which is the same as that performed in steps S21 to S24 of the interrupt process of FIG. 3B. In brief, the master microcomputer 301 sets a predetermined number of FH execution times (step S81), resets the FH counter (step S82), allows interruption from the FH counter (step S83), and prohibits interruption to the TX_TIME terminal (step S84).

Figure 7C:
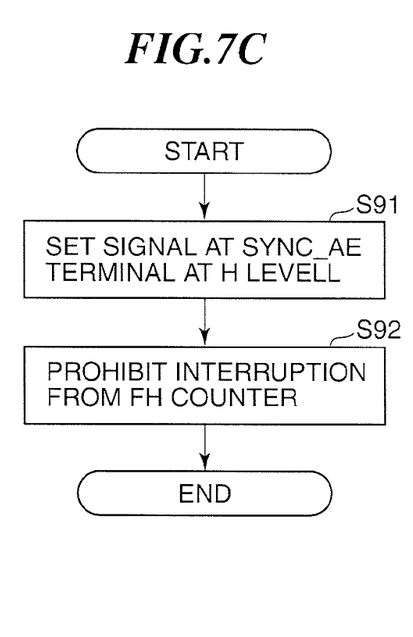
[FIG. 7C] A flowchart showing an interrupt process performed by the master microcomputer when an interruption is generated from a FH counter.

FIG. 7C shows in flowchart an interrupt process performed by the master microcomputer 301 when an interruption is generated from the FH counter.

The interrupt process of FIG. 7C is started when frequency hopping has been performed the predetermined number of times, e.g., four times (i.e., at timing T5 shown in FIG. 6) from the start of transmission of the wireless transmission signal M2 by the transmitter-receiver unit 310.

In step S91, the master microcomputer 301 sets an output signal appearing at the SYNC_AE terminal at H level for a predetermined period time, whereby the light measurement unit 320 starts a light measurement operation.

In step S92, the master microcomputer 301 prohibits interruption from the FH counter to thereby prevent interruption from being generated from the FH counter after completion of the light measurement, whereupon the interrupt process is completed.

Figure 8A:
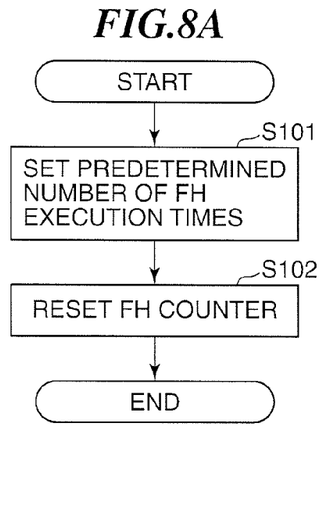
[FIG. 8A] A flowchart showing operation process performed by a slave microcomputer of the second embodiment when an interruption occurs at the RX_TIME terminal.

FIG. 8A shows in flowchart an operation process performed by the slave microcomputer 401 when interruption occurs at the RX_TIME terminal.

When the wireless transmitter-receiver unit 410 of the light emission device 400 receives the signal S1 from the camera 300 through the antenna 311, a reception timing signal of H level is supplied to the RX_TIME terminal of the slave microcomputer 401 and interruption occurs at the RX_TIME terminal, whereby the operation process of FIG. 8A is started.

In steps S101 to S102 of the interrupt process shown in FIG. 8A, processing is performed, which is the same as that in steps S41 to S42 of the interrupt process shown in FIG. 4A. More specifically, the slave microcomputer 401 sets the predetermined number of FH execution times (step S101), and resets the FH counter (step S102).

Figure 8B:
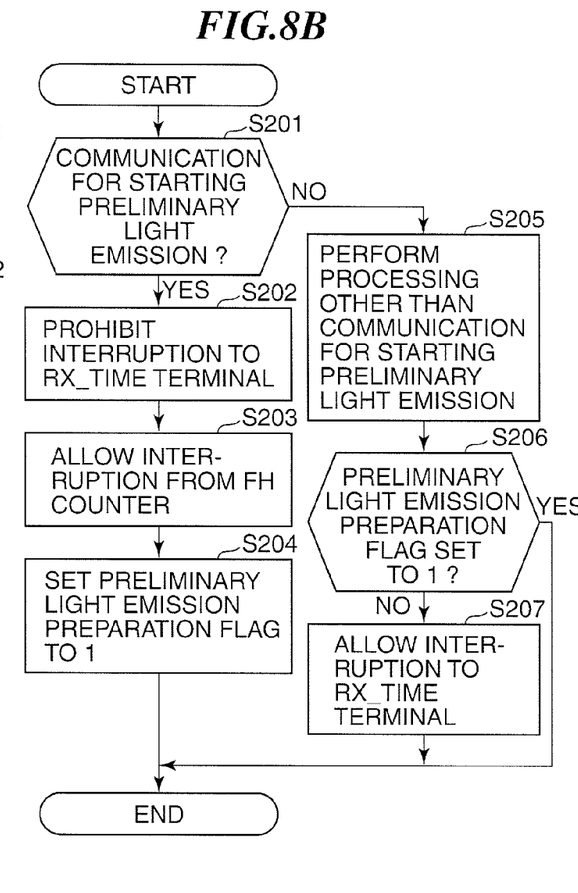
[FIG. 8B] A flowchart showing an interrupt process performed by the slave microcomputer in response to a signal transmitted from the wireless transmitter-receiver unit to the slave microcomputer.

FIG. 8B shows in flowchart an interrupt process performed by the slave microcomputer 401 in response to a signal S2 transmitted from the wireless transmitter-receiver unit 410 to the slave microcomputer 401.

The transmitter-receiver unit 410 demodulates a signal S1 received from the camera 300 into a signal S2, and transmits the signal S2 to the slave microcomputer 401. Upon completion of transmission of the signal S2 (i.e., at timing T4 in FIG. 6), the interrupt process of FIG. 8B is started.

In step S201, the slave microcomputer 401 determines whether or not communication with the camera 300 is communication for starting preliminary light emission, and if the answer to step S201 is YES, proceeds to step S202. Otherwise, the process proceeds to step S205.

In step S202, the slave microcomputer 401 prohibits interruption to the RX_TIME terminal. Next, the slave microcomputer 401 allows interruption from the FH counter (step S203), sets a "preliminary light emission preparation" flag to a value of 1 (step S204), and completes the present process.

In step S205, the slave microcomputer 401 performs communication processing other than communication for starting preliminary light emission. Next, the slave microcomputer 401 determines whether or not the "preliminary light emission preparation" flag has a value of 1 (step S206), and if the answer to step S205 is YES, completes the present process. Otherwise, the process proceeds to step S207.

In step S207, the slave microcomputer 401 allows interruption to the RX_TIME terminal, and completes the present process. By allowing interruption to the RX_TIME terminal only when it is determined in step S206 that the "preliminary light emission preparation" flag does not have a value of 1, it is possible to prevent interruption to the RX_TIME terminal during the preparation for preliminary light emission.

Figure 8C:
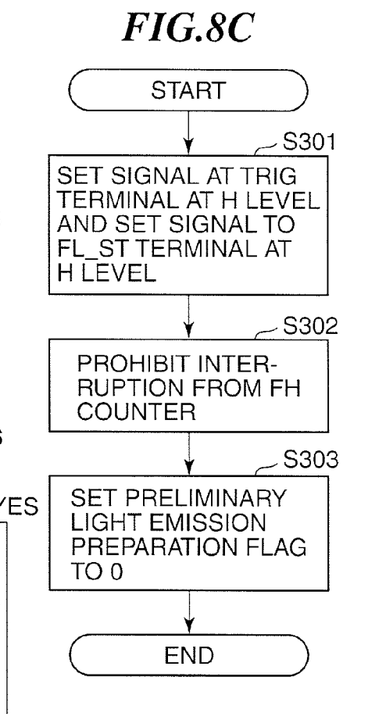
[FIG. 8C] A flowchart showing an interrupt process performed by the slave microcomputer when an interruption is generated from the FH counter.

FIG. 8C shows in flowchart an interrupt process performed by the slave microcomputer 401 upon occurrence of interruption from the FH counter.

When frequency hopping has been performed the predetermined number of times (e.g., four times) from when the transmitter-receiver unit 410 received a wireless signal, interruption is generated from the FH counter at timing T5 in FIG. 6, and the interrupt process shown in FIG. 8C is started.

In step S301, the slave microcomputer 401 sets an output signal appearing at the TRIG terminal at H level for a predetermined period of time, and sets a signal to the FL_ST terminal at H level for a period of time that varies according to an amount of preliminary light emission. As a result, the electric discharge tube 423 performs a preliminary light emission operation at timing T5 in FIG. 6.

In step S302, the slave microcomputer 401 prohibits interruption from the FH counter to thereby prevent interruption from being generated from the FH counter after completion of the preliminary light emission operation. Next, the slave microcomputer 401 sets the "preliminary light emission preparation" flag to a value of 0 (step S63), and completes the interrupt process.

According to this embodiment, a preliminary light emission operation and a light measurement operation are performed at timing T5 where frequency hopping has been performed the predetermined number of times from when transmission of the wireless signal M2 from the camera 300 to the light emission device 400 and reception of the signal S1 by the light emission device 400 were started. As a result, it is possible to achieve synchronization between the preliminary light emission operation and the light measurement operation, even if there is a variation in the time period (denoted by TM1 in FIG. 6) from when communication of the signal M1 by the camera 300 was started to when transmission of the signal M2 was started or even if there is a variation in the time period (denoted by TS1 in FIG. 6) from when reception of the signal S1 by the transmitter-receiver unit 410 was started to when transmission of the signal S2 was started.

It is also possible to achieve synchronization between a photographing operation of the camera 300 and a main light emission operation of the light emission device 400. More specifically, the master microcomputer 301 performs communication (M1 in FIG. 6) with the light emission device 400 to instruct an amount of main light emission and start of main light emission at timing T1 in FIG. 6, and outputs a H level signal (M3 in FIG. 6) to the SYNC_CAP terminal at timing T5 to cause the image pickup unit 330 to start a photographing operation. At timing T5, the slave microcomputer 401 controls the light emission device 400 to perform main light emission (S3 in FIG. 6), as with the case of the preliminary light emission operation. As a result, the photographing operation of the camera 300 and the main light emission operation of the light emission device 400 are synchronized with each other.

It should be noted that although the wireless transmitter-receiver unit is built in each of the camera 300 and the light emission device 400 in this embodiment, the wireless transmitter-receiver unit can be externally connected thereto. Although the predetermined number of FH execution times is set to a fixed value (e.g., four times), it is possible to decide the predetermined number of FH execution times based on at least one of operation conditions of the master device and the slave device and to transmit information representing the decided predetermined number of FH execution times to the transmitter-receiver unit of the slave device 400, as with the case of the first embodiment.

In the slave device of this embodiment, an electric discharge tube is used as the light emission unit of the light emission device. Alternatively, an LED or a lamp can be used. Both the master device and the slave device can each be constituted by a camera, and photographing can be performed while synchronizing the two cameras with each other.

(Other Embodiments)

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Reference Signs List
100 Master device
101 Master microcomputer
110 Wireless transmitter-receiver unit
111 Antenna
120 RTC unit
200 Slave device
201 Slave microcomputer
210 Wireless transmitter-receiver unit
211 Antenna
220 RTC unit

The invention claimed is:

1. A wireless communication system comprising:
a master device including a first time measuring unit configured to count time, a first wireless transmitter-receiver unit configured to perform wireless communication by a frequency hopping system and configured to output a first change timing signal and configured to output a transmission timing signal at a time of wireless transmission, and a first control unit configured to output a first sync signal to the first time measuring unit, after the transmission timing signal is received and then a carrier frequency is changed a predetermined number of times according to the first change timing signal; and
a slave device including a second time measuring unit configured to count time, a second wireless transmitter-receiver unit configured to perform wireless communication by a frequency hopping system and configured to output a second change timing signal and configured to output a reception timing signal at a time of wireless reception, and a second control unit configured to output a second sync signal to the second time measuring unit after the reception timing signal is received and then a carrier frequency is changed the predetermined number of times according to the second change timing signal,
wherein the first change timing signal, the transmission timing signal, and the first sync signal are different from one another, and
wherein the second change timing signal, the reception timing signal, and the second sync signal are different from one another.

2. The wireless communication system according to claim 1, wherein the first control unit synchronizes the first time measuring unit according to the first sync signal, and
the second control unit synchronizes the second time measuring unit according to the second sync signal.

3. The wireless communication system according to claim 1, wherein the first wireless transmitter-receiver unit decides, based on at least one of operation conditions of said master device and said slave device, the predetermined number of times for which the carrier frequency is to be changed from when the transmission timing signal is received to when the first sync signal is output, and transmits information representing the decided predetermined number of times to the second wireless transmitter-receiver unit.

4. The wireless communication system according to claim 3, wherein the operation conditions of said master device and said slave device include an amount and speed of communication from the first control unit to the first wireless transmitter-receiver unit, an amount and speed of communication from the second wireless transmitter-receiver unit to the second control unit, and a frequency hopping change interval.

5. The wireless communication system according to claim 1, wherein the first wireless transmitter-receiver unit is built in or externally connected to said master device, and the second wireless transmitter-receiver unit is built in or externally connected to said slave device.

6. A wireless communication system comprising:
a master device including a first wireless transmitter-receiver unit configured to perform wireless communication by a frequency hopping system and configured to output a first change timing signal and configured to output a transmission timing signal at a time of wireless transmission, and a first control unit configured to cause said master device to start a predetermined operation after the transmission timing signal is received and then a carrier frequency is changed a predetermined number of times according to the first change timing signal; and a slave device including a second wireless transmitter-receiver unit configured to perform wireless communication by a frequency hopping system and configured to output a second change timing signal and configured to output a reception timing signal at a time of wireless reception, and a second control unit configured to cause the slave device to start an operation corresponding to the predetermined operation of said master device after the reception timing signal is received and then a carrier frequency is changed the predetermined number of times according to the second change timing signal, wherein the first change timing signal and the transmission timing signal are different from each other, and wherein the second change timing signal and the reception timing signal are different from each other.

7. The wireless communication system according to claim 6, wherein said master device is an image pickup apparatus, said slave device is a light emission device having a light emission unit, said first control unit causes the image pickup apparatus to start a light measurement operation after the transmission timing signal is received and then the carrier frequency is changed the predetermined number of times, and said second control unit causes the light emission unit to start a preliminary light emission operation after the reception timing signal is received and then the carrier frequency is changed the predetermined number of times.

8. The wireless communication system according to claim 6, wherein said master device is an image pickup apparatus, said slave device is a light emission device having a light emission unit, said first control unit causes the image pickup apparatus to start a photographing operation after the transmission timing signal is received and then the carrier frequency is changed the predetermined number of times, and said second control unit causes the light emission unit to start a main light emission operation after the reception timing signal is received and then the carrier frequency is changed the predetermined number of times.

9. The wireless communication system according to claim 6, wherein said master device is a first image pickup apparatus, said slave device is a second image pickup apparatus, said first control unit causes the first image pickup apparatus to start a photographing operation after the transmission timing signal is received and then the carrier frequency is changed the predetermined number of times, and said second control unit causes the second image pickup apparatus to start a photographing operation after the reception timing signal is received and then the carrier frequency is changed the predetermined number of times.

10. The wireless communication system according to claim 6, wherein the first wireless transmitter-receiver unit decides, based on at least one of operation conditions of said master device and said slave device, the predetermined number of times for which the carrier frequency is to be changed from when the transmission timing signal is received to when said master device is caused to start the predetermined operation, and transmits information representing the decided predetermined number of times to the second wireless transmitter-receiver unit.

11. The wireless communication system according to claim 10, wherein the operation conditions of said master device and said slave device include an amount and speed of communication from the first control unit to the first wireless transmitter-receiver unit, an amount and speed of communication from the second wireless transmitter-receiver unit to the second control unit, and a frequency hopping change interval.

12. The wireless communication system according to claim 6, wherein the first wireless transmitter-receiver unit is built in or externally connected to said master device, and the second wireless transmitter-receiver unit is built in or externally connected to said slave device.

13. An electronic device that performs wireless communication by a frequency hopping system, comprising:

a time measuring unit configured to count time;

a wireless transmitter-receiver unit configured to output a change timing signal and configured to output a transmission timing signal at a time of wireless transmission; and a control unit configured to output a sync signal to the time measuring unit after the transmission timing signal is received and then a carrier frequency is changed a predetermined number of times according to the change timing signal, wherein the change timing signal, the transmission timing signal, and the sync signal are different from one another.

14. An electronic device that performs wireless communication by a frequency hopping system, comprising:

a time measuring unit configured to count time;

a wireless transmitter-receiver unit configured to output a change timing signal and configured to output a reception timing signal at a time of wireless reception; and a control unit configured to output a sync signal to the time measuring unit after the reception timing signal is received and then a carrier frequency is changed the predetermined number of times according to the change timing signal, wherein the change timing signal, the reception timing signal, and the sync signal are different from one another.

15. An electronic device that performs wireless communication by a frequency hopping system, comprising:

a wireless transmitter-receiver unit configured to output a change timing signal and configured to output a transmission timing signal at a time of wireless transmission; and a control unit configured to cause a predetermined operation to start after the transmission timing signal is received and then a carrier frequency is changed a predetermined number of times according to the change timing signal, wherein the change timing signal and the transmission timing signal are different from each other.

16. An electronic device that performs wireless communication with another electronic device by a frequency hopping system, comprising:

a wireless transmitter-receiver unit configured to output change timing signal and configured to output a reception timing signal at a time of wireless reception; and a control unit configured to cause an operation corresponding to a predetermined operation of the other electronic device to start after the reception timing signal is received and then a carrier frequency is changed the predetermined number of times according to the change timing signal, wherein the second change timing signal and the reception timing signal are different from each other.

17. A control method for a wireless communication system having a master device including a first time measuring unit that counts time, a first wireless transmitter-receiver unit that performs wireless communication by a frequency hopping system, and a first control unit, and a slave device including a second time measuring unit that counts time, a second wireless transmitter-receiver unit that performs wireless communication by a frequency hopping system, and a second control unit, comprising the steps of:
 outputting a first change timing signal from the first wireless transmitter-receiver unit to the first control unit;
 outputting a transmission timing signal from the first wireless transmitter-receiver unit to the first control unit at a time of wireless transmission from the first wireless transmitter-receiver unit;
 outputting a first sync signal from the first control unit to the first time measuring unit after the transmission timing signal is received by the first control unit and then a carrier frequency is changed a predetermined number of times according to the first change timing signal;
 outputting a second change timing signal from the second wireless transmitter-receiver unit to the second control unit;
 outputting a reception timing signal from the second wireless transmitter-receiver unit to the second control unit at a time of wireless reception by the second wireless transmitter-receiver unit; and
 outputting a second sync signal from the second control unit after the reception timing signal is received by the second control unit and then a carrier frequency is changed the predetermined number of times according to the second change timing signal,
 wherein the first change timing signal, the transmission timing signal, and the first sync signal are different from one another, and
 wherein the second change timing signal, the reception timing signal, and the second sync signal are different from one another.

18. A control method for a wireless communication system comprising a master device including a first wireless transmitter-receiver unit that performs wireless communication by a frequency hopping system and a first control unit, and a slave device including a second wireless transmitter-receiver unit that performs wireless communication by a frequency hopping system and a second control unit, comprising the steps of:
 outputting a first change timing signal from the first wireless transmitter-receiver unit to the first control unit;
 outputting a transmission timing signal from the first wireless transmitter-receiver unit to the first control unit at a time of wireless transmission from the first wireless transmitter-receiver unit;
 causing the master device to start a predetermined operation under control of the first control unit after the transmission timing signal is received by the first control unit and then a carrier frequency is changed a predetermined number of times according to the first change timing signal;
 outputting a second change timing signal from the second wireless transmitter-receiver unit to the second control unit;
 outputting a reception timing signal from the second wireless transmitter-receiver unit to the second control unit at a time of wireless reception by the second wireless transmitter-receiver unit; and
 causing the slave device to start an operation corresponding to the predetermined operation of the master device under control of the second control unit after the reception timing signal is received by the second control unit and then the carrier frequency is changed the predetermined number of times according to the second change timing signal,
 wherein the first change timing signal and the transmission timing signal are different from each other, and
 wherein the second change timing signal and the reception timing signal are different from each other.

19. A control method for an electronic device including a time measuring unit that counts time, a wireless transmitter-receiver unit that performs wireless communication by a frequency hopping system, and a control unit, comprising the steps of:
 outputting a change timing signal from the wireless transmitter-receiver unit to the control unit;
 outputting a transmission timing signal from the wireless transmitter-receiver unit to the control unit at a time of wireless transmission from the wireless transmitter-receiver unit; and
 outputting a sync signal from the control unit to the time measuring unit after the transmission timing signal is received by the control unit and then a carrier frequency is changed the predetermined number of times according to the change timing signal,
 wherein the change timing signal, the transmission timing signal, and the sync signal are different from one another.

20. A control method for an electronic device including a time measuring unit that counts time, a wireless transmitter-receiver unit that performs wireless communication by a frequency hopping system, and a control unit, comprising the steps of:
 outputting a change timing signal from the wireless transmitter-receiver unit to the control unit;
 outputting a reception timing signal from the wireless transmitter-receiver unit to the control unit at a time of wireless reception by the wireless transmitter-receiver unit; and
 outputting a sync signal from the control unit to the time measuring unit after the reception timing signal is received by the control unit and then a carrier frequency is changed a predetermined number of times according to the change timing signal,
 wherein the change timing signal, the reception timing signal, and the sync signal are different from one another.

21. A control method for an electronic device including a wireless transmitter-receiver unit that performs wireless communication by a frequency hopping system, and a control unit, comprising the steps of:
 outputting a change timing signal from the wireless transmitter-receiver unit to the control unit;
 outputting a transmission timing signal from the wireless transmitter-receiver unit to the control unit at a time of wireless transmission from the wireless transmitter-receiver unit; and
 causing a predetermined operation to start under control of the control unit after the transmission timing signal is received by the control unit and then a carrier frequency is changed a predetermined number of times according to the change timing signal,
 wherein the change timing signal and the transmission timing signal are different from each other.

22. A control method for an electronic device including a wireless transmitter-receiver unit that performs wireless communication with another electronic device by a frequency hopping system and a control unit, comprising the steps of:

outputting a change timing signal from the wireless transmitter-receiver unit to the control unit;

outputting a reception timing signal from the wireless transmitter-receiver unit to the control unit at a time of wireless reception by the wireless transmitter-receiver unit; and causing an operation corresponding to a predetermined operation of the other electronic device to start under control of the control unit after the reception timing signal is received by the control unit and then a carrier frequency is changed a predetermined number of times according to the change timing signal, wherein the second change timing signal and the reception timing signal are different from each other.

23. A non-transitory computer-readable storage medium storing a program for causing a computer to execute the control method as set forth in claim 17.

24. A non-transitory computer-readable storage medium storing a program for causing a computer to execute the control method as set forth in claim 18.

25. A non-transitory computer-readable storage medium storing a program for causing a computer to execute the control method as set forth in claim 19.

26. A non-transitory computer-readable storage medium storing a program for causing a computer to execute the control method as set forth in claim 20.

27. A non-transitory computer-readable storage medium storing a program for causing a computer to execute the control method as set forth in claim 21.

28. A non-transitory computer-readable storage medium storing a program for causing a computer to execute the control method as set forth in claim 22.

\* \* \* \* \*